United States Patent [19]

Iizuka et al.

[11] 4,143,635

[45] Mar. 13, 1979

[54] EXHAUST GAS RECIRCULATED ENGINE WITH VARIABLE CYLINDER DISABLEMENT CONTROL

[75] Inventors: Haruhiko Iizuka; Seishi Yasuhara, both of Yokosuka, Japan

[73] Assignee: Nissan Motor Company, Limited, Japan

[21] Appl. No.: 858,011

[22] Filed: Dec. 6, 1977

[30] Foreign Application Priority Data

Dec. 8, 1976 [JP] Japan .................................. 51-146602

[51] Int. Cl.² ........................ F02D 17/02; F02B 75/10
[52] U.S. Cl. ................................. 123/198 F; 60/278; 123/32 EA; 123/119 A
[58] Field of Search ........ 123/198 F, 119 A, 198 DB, 123/32 EA; 60/278

[56] References Cited

U.S. PATENT DOCUMENTS

| | | | |
|---|---|---|---|
| 3,776,207 | 12/1973 | Simko | 123/119 A |
| 3,916,622 | 11/1975 | Gospodar | 123/198 F X |
| 3,941,113 | 3/1976 | Baguelin | 123/198 F X |
| 3,955,363 | 5/1976 | Manderscheid | 123/198 F X |
| 3,982,395 | 9/1976 | Hasegawa et al. | 60/278 |
| 4,023,358 | 5/1977 | Maurer et al. | 123/198 F X |
| 4,056,933 | 11/1977 | Nohira et al. | 60/278 |

*Primary Examiner*—Ira S. Lazarus
*Attorney, Agent, or Firm*—Robert E. Burns; Emmanuel J. Lobato; Bruce L. Adams

[57] ABSTRACT

A multi-cylinder internal combustion engine is provided with first and second exhaust systems respectively for first and second groups of cylinders. An exhaust gas recirculation passage is provided between the second exhaust system and an air intake passage. The cylinders in the first group is selectively disabled in response to the magnitude of engine load when reduced engine output power can operate the vehicle adequately.

6 Claims, 4 Drawing Figures

EXHAUST GAS RECIRCULATED ENGINE WITH VARIABLE CYLINDER DISABLEMENT CONTROL

BACKGROUND OF THE INVENTION

The present invention relates to a multi-cylinder internal combustion engines, and specifically to such an engine incorporating engine exhaust recirculation (EGR) wherein certain of the cylinders is selectively disable when reduced power output can operate the vehicle without adversely affecting the performance of EGR.

Variable cylinder disablement is known in the art to improve fuel economy by selectively shutting off fuel supply to several cylinders of the engine when reduced power output can operate the vehicle adequately. This disablement, known as variable displacement control, is particularly advantageous for application to electronic fuel injection because the fuel injectors can be electrically disabled to cut off fuel without having the need for mechanical parts to shut off intake valves which would otherwise be required in carbureted engines. On the other hand, exhaust gas recirculation is also known as an effective means for minimizing the harmful product NOx by recirculating a portion of exhaust emissions through combustion chambers. However, when EGR is used in conjunction with the variable displacement internal combustion engine where several cylinders are unfueled, and the unfueled cylinders draw in air and exhaust it through exhaust manifold. This is likely to result in a greater oxygen content than is intended for normal EGR operations. Therefore, exhaust gas recirculation cannot properly operate.

SUMMARY OF THE INVENTION

The primary object of the invention is to ensure that EGR-controlled electronic fuel injected internal combustion engine can properly operate in variable cylinder disablement mode.

The present invention contemplates the use of separate exhaust systems respectively for different cylinder groups. An exhaust gas recirculation passage is provided between one of the separate exhaust systems and the air intake passage. A cylinder disabling circuit disables primarily those cylinders not associated with the EGR passage so that the oxygen content of the exhaust system not provided with EGR increases, while the oxygen content of the EGR-equipped exhaust system does not substantially increase. Because of the disablement of cylinders, the temperature of the disabled cylinders may reduce to a level which tends to introduce hesitation when the cylinder is fueled again. Temperature sensors may be provided to represent the temperature of the cylinder group which is primarily disabled and the temperature of the cylinder group which is not substantially disabled to such an extent that its temperature does not vary. The sensed temperature are compared against each other to detect when the temperature of the disabled engine group falls below the temperature of the other group so as to inhibit the disabling operation.

Displacement takes place in response to the magnitude of engine load such that a predetermined maximum number of cylinders is disabled when the vehicle is at light load and the number of disabled cylinder is reduced to zero at full load operation. When the vehicle is operated at a load which lies within an intermediate range between a low and a high engine load value, the previous disablement mode is continued to stabilize the engine performance.

BRIEF DESCRIPTION OF THE DRAWINGS

The invention will be further described with reference to the accompanying drawings, in which.

DESCRIPTION OF THE PREFERRED EMBODIMENT

Figure 1:
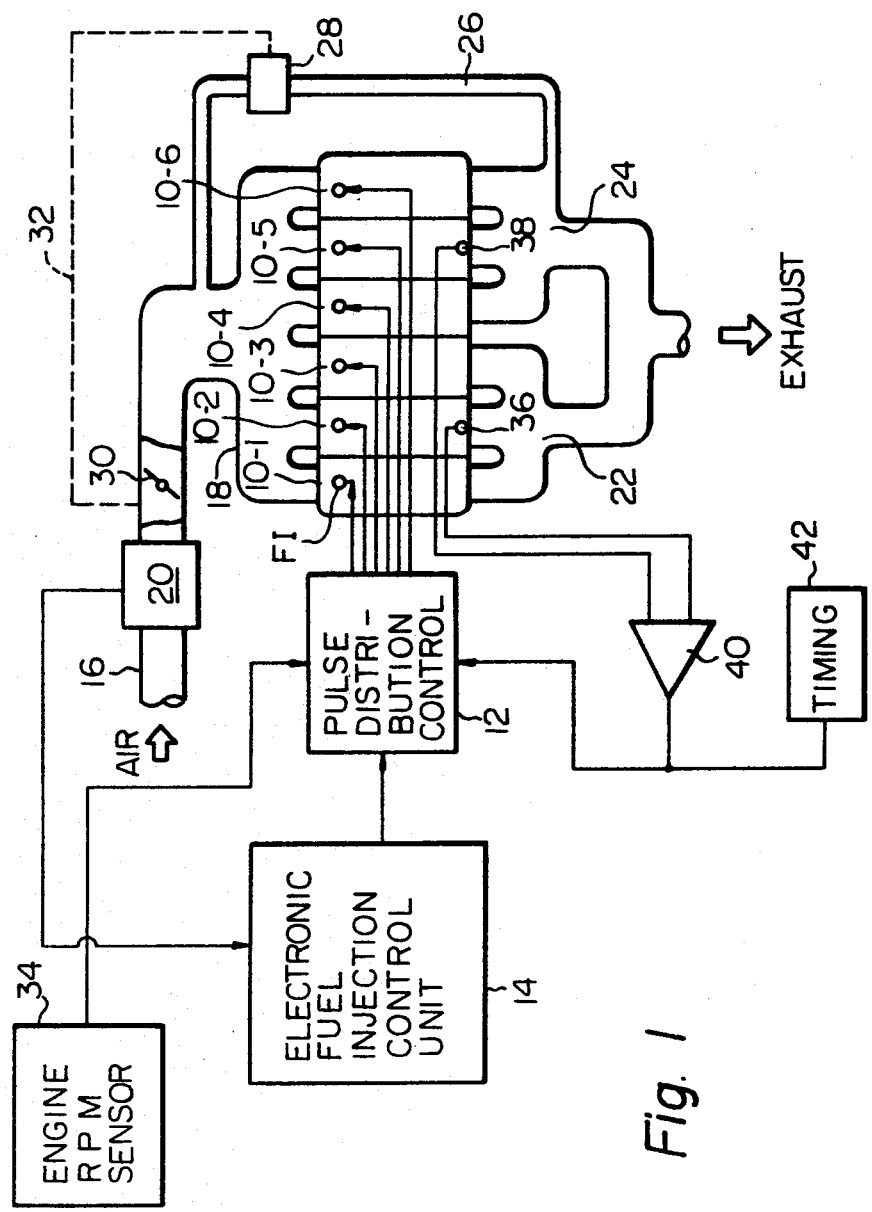
FIG. 1 is a schematic diagram of an embodiment of the invention.

Referring now to FIG. 1 of the drawings, there is shown a functional block diagram of the invention. A multi-cylinder internal combustion engine 10 is shown as comprising six cylinders 10-1 through 10-6 each provided with a fuel injector FI which is activated by injection pulses supplied via a pulse distribution control unit 12 from the conventional electronic fuel injection control unit 14. Air is inducted through passage 16 which leads to a intake manifold 18. In the passage 16 is disposed an air quantity detector 20 to deliver a voltage signal representative of the volume of air inducted per cylinder cycle to the injection control unit 14 as an operating parameter of the engine to permit it to determine the width of the injection pulse appropriate for the particular engine condition.

The exhaust manifold of the engine is physically separated so that the exhaust posts of the cylinders 10-1 through 10-3 are connected to a first manifold 22 and the exhaust ports of the remainder are connected to a second manifold 24. Part of the emissions through the second manifold 24 is allowed to pass through an exhaust gas recirculation (EGR) conduit 26 to the intake manifold 18. An EGR control valve 28 of conventional design is disposed in the EGR passage to control the amount of recirculated gases in response to the degree of vacuum depression upstream of the throttle control valve 30 through conduit as indicated by broken lines 32. Therefore, recirculation of the gases is only carried out primarily for the cylinders 10-4 through 10-6.

The pulse distribution control unit 12 functions to deliver injection pulses supplied from the injection control unit 14 to varying members of cylinders in response to varying engine loads. An engine RPM sensor 34 is provided to deliver a voltage signal representative of the engine speed to the distribution control unit 12. As will be described the control unit 12 initiates the deactivation of cylinders when the engine speed is above a predetermined level.

Temperature sensors 36 and 38 are affixed to the engine block to detect the cylinder temperatures representative of the cylinder group 10-1 to 10-3 and of the cylinder group 10-4 to 10-6. Specifically, temperature sensors 36 and 38 are respectively provided adjacent to the cylinders 10-2 and 10-5 to represent the temperatures of the associated cylinder groups. The temperature representative signals from sensors 36 and 38 are applied to a comparator 40 to signal the distribution control unit 12 to cease deactivation when the temperature of one cylinder group has reduced to such a degree that it deviates excessively from the temperature of the other cylinder group due to the non-combustion of deactivated cylinders.

A timing control circuit 42 is also provided which delivers a timing signal at intervals to the pulse distribution control unit 12 to periodically interrupt the deactivation.

Figure 2:
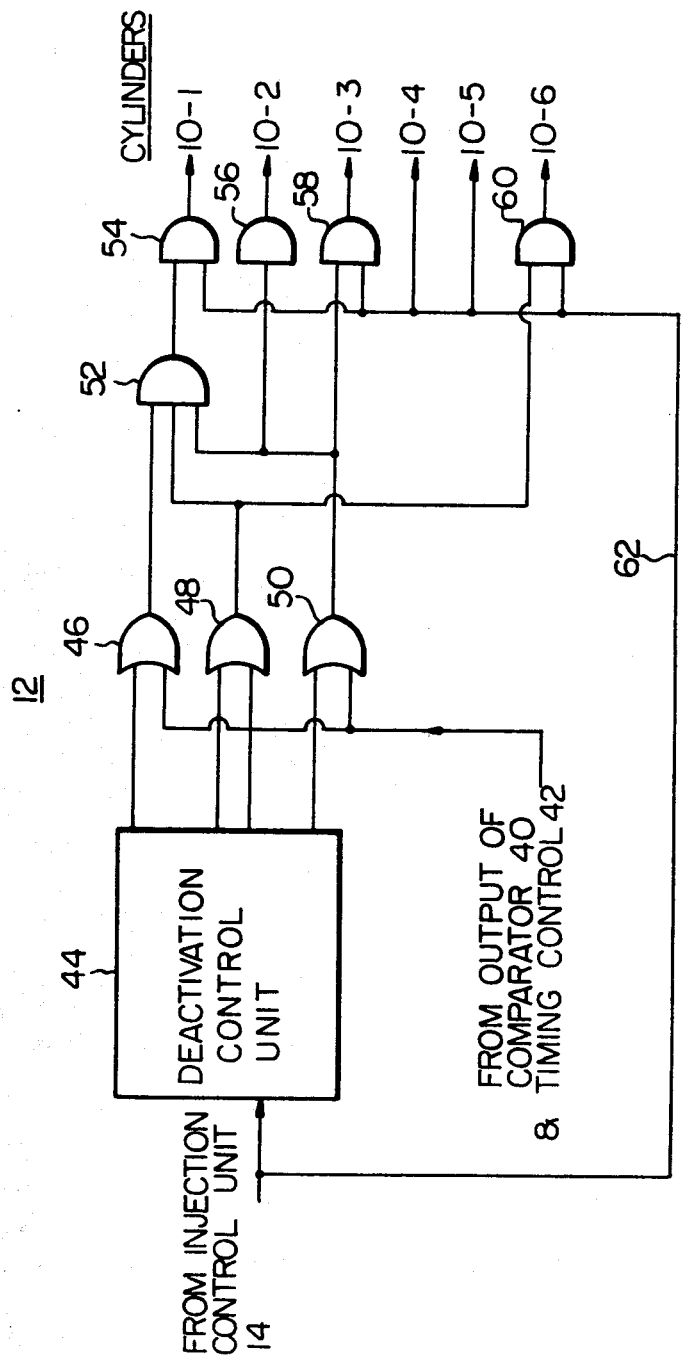
FIG. 2 shows the detail of a pulse distribution control unit of FIG. 1.

An example of the pulse distribution control unit 12 is illustrated in FIG. 2 which includes a cylinder deactivation control unit 44. This unit receives the injection pulses from the control unit 14 to detect the magnitude of load exerted on the engine 10 to determine the number of deactivated cylinders. When deactivation is not appropriate, the control unit 14 applies a logic "1" output to all OR gates 46, 48, 50 to enable all AND gates 52, 54, 56, 58 and 60 to pass injection pulse from control unit 14 through lead 62.

When the vehicle can operate with one cylinder disabled, the deactivation control unit 44 applies a logic "0" output to OR gate 46 so that AND gates 52 and 54 are disabled to prevent the passage of injection pulse to the fuel injector of cylinder 10-1.

During two-cylinder disablement mode, the "0" logic disabling signal is applied only to OR gate 48 so that AND gates 52, 54 and 60 are disabled to prevent the passage of injection pulse to the fuel injectors associated with cylinders 10-1 and 10-6. In this 6-cylinder internal combustion engine ignition takes place in the recycle order of cylinders 10-1, 10-5, 10-3, 10-6, 10-2 to 10-4. Therefore, the deactivation of cylinders 10-1 and 10-6 in the two-cylinder disablement mode permits ignition to take place at equal intervals.

The "0" level disabling signal will be applied to OR gate 50 during three-cylinder disabling mode to disable AND gates 52, 54, 56 and 58 to prevent the passage of injection pulse to fuel injectors associated with cylinders 10-1, 10-2 and 10-3.

It will be appreciated that during the two-cylinder disablement mode, the oxygen content of the exhaust manifold 24 will increase as a result of noncombustion of cylinder 10-6 since it permits only air to be exhausted. It is found however that the increase in oxygen content during two-cylinder disablement does not materially affect the performance of the exhaust gas recirculation processed for the second group of cylinders.

The signals from the comparator 40 and the timing circuit 42 are connected to the OR gates 46, 48, 50. If deactivation is prolonged, the temperature of cylinder group 10-1 to 10-3 will because lower than the temperature of the cylinder group 10-4 to 10-6. When the signal from temperature sensor 36 falls below the signal from sensor 38, the comparator 40 delivers a logic "1" to all OR gates 46, 48, 50 so that all AND gates are enabled terminating the deactivation process. A similar event occurs when logic "1" is supplied from the timing control circuit 42.

Figure 3:
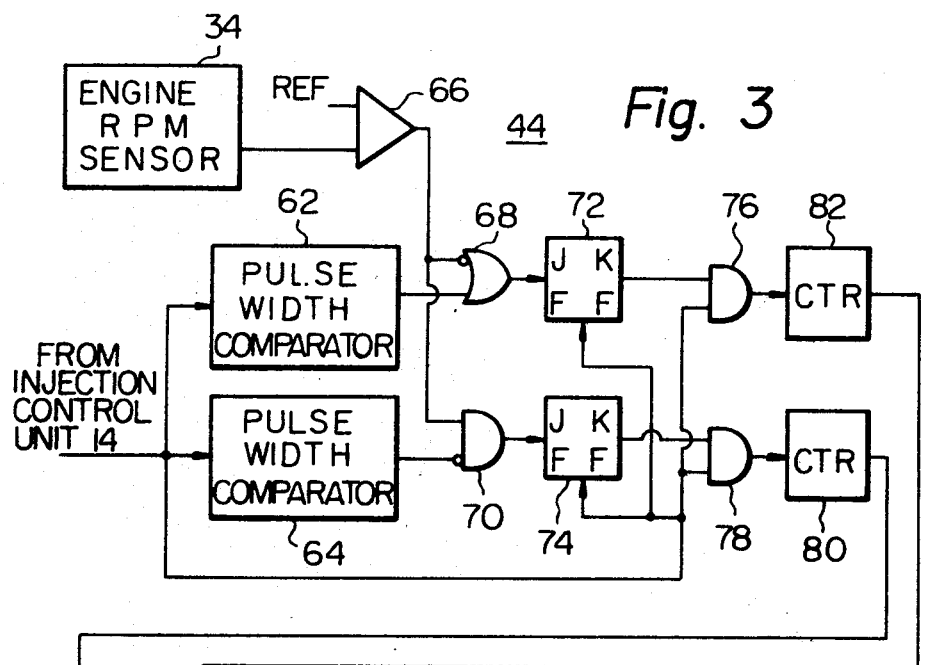
FIG. 3 shows the detail of a cylinder deactivation control unit of FIG. 2.

FIG. 3 illustrates an example of the deactivation control unit 44. Two pulse width comparators 62 and 64 are provided to receive the injection pulses from the injection control unit 14. Since the width of the injection pulse is representative of the engine's varying load, each of these comparators detects when the engine load is above or below a predetermined value by comparing the width of the pulse with a predetermined pulse width representing the predetermined load.

Figure 4:
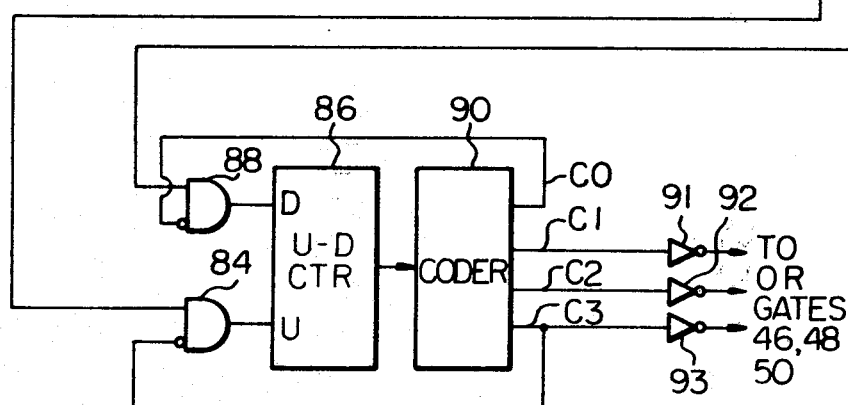
FIG. 4 shows the detail of a pulse width comparator of FIG. 3.

As illustrated in FIG. 4, each of the comparators 62, 64 includes a monostable multivibrator 71 which is connected to receive the injection pulse to provide an output pulse of a constant or reference duration representing the pdetermined engine load. In the comparator 62, the reference engine load is set at a relatively high level, while in the comparator 64 it is set at a relatively low level. The output from the monostable 71 is connected to the noninverted input of AND gate 72 and to the inverted input of AND gate 73 whose noninverted input is connected to the inverted input of AND gate 72 and also to the input of monostable 71. When the injection pulse has a greater pulse width than the reference time duration set by the monostable 71, AND gate 73 will be activated to provide a "1" logic output to the set terminal of a flip-flop 74. This flip-flop will be reset by a logic "1" output from AND gate 72 when the injection pulse has a duration smaller than the reference duration. Therefore, the output of flip-flop 74 is an indication of whether the engine load is above or below the setting level.

The pulse width comparator 62 is designed to produce a logic "1" output when engine load is above a higher threshold level, while comparator 64 is designed to produce a logic "1" output when engine load is above a lower threshold level.

The output from the engine RPM sensor 34 is compared in a comparator 66 with a reference voltage representing a predetermined engine speed and when engine speed is above the reference value, a logic "1" is supplied from the comparator 66 to an inverted input of an OR gate 68 and also to an input of an AND gate 70.

When the vehicle is running at a speed above the reference engine RPM and at the same time the engine load falls below the lower threshold level, the outputs of comparators 62 and 64 are both at logic "0" level. The "0" logic from comparator 62 is passed through OR gate 68 to a J-K flip-flop 72, while the "0" logic of comparator 64 is applied to an inverted input of the AND gate 70 so that the output of AND gate 70 is at "1" logic level which is applied to a J-K flip-flops occurs.

The change of binary state of both flip-flop occurs in step with the trailing edge of the injection pulse applied to their clock terminals in order to avoid the loss or multilation of an injection pulse during the transient period.

The injection pulse from the control unit 14 is thus applied through AND gate 78 to a counter 80 while its another passage through AND gate 76 to a counter 82 is disabled by the "0" logic state of flip-flop 72. The counters 80 and 82 are switched to a logic "1" level at the count of every three input pulses and remains there until the count of the next three input pulses. With a count of three input pulses applied through the enabled AND gate 78, the counter 80 delivers a "1" logic output which is applied through an AND gate 84 (which is enabled at this time) to the up-count terminal of an up-down counter.

The output of the counter 82 is connected through an AND gate 88 to the down-count terminal of the counter 86.

Connected to the output of the up-down counter 86 is a binary-to-decimal converter 90 which is provided with four output terminals C0, C1, C2 and C3. The "1" logic level of these output terminals represents the number of disabled cylinders so that terminal C0 represents no cylinder disablement mode and terminal C1 represents one cylinder disablement mode and so on. Therefore, AND gate 84 is enabled when the engine is other than in a three-cylinder disablement mode, while AND gate 88 is enabled during any one of disablement modes other than zero mode.

Therefore, it will be apparent that counter 86 keeps up-counting until the decoder 90 delivers a "1" logic signal to the terminal C3 whereupon the engine enters a three-cylinder disablement mode, and during the up-counting operation, the "1" logic disabling signal is shifted from terminals C0 to C3 in step with the occurrence of each "1" logic output from the counter 80 so that the number of disabled cylinders increases on a one-at-a-time basis. As shown, the disabling signals from terminals C1 to C3 are coupled through NOT circuits 91, 92, 93 to OR gates 46, 48 and 50, respectively.

When the engine load increases so that it is above the lower threshold level but below the higher threshold level, the pulse width comparator 64 changes its binary state to logic "1" so that AND gate 74 and hence flip-flop 74 changes to logic "0." Therefore, both AND gates 76 and 78 are at logic "0" level and the input pulses to counters 80 and 82 are both disabled. Under these conditions, the state of the up-down counter 86 and the decimal coder 90 remains unchanged as long as the engine load is intermediate the lower and higher threshold levels.

When the engine load exceeds the higher threshold level, the pulse width comparator 62 is switched to a logic "1" state which turns flip-flop 72 to "1," enabling AND gate 76. The passage for the injection pulse to the counter 82 now opens. In a manner identical to that described in connection with up-count mode, the up-down counter 86 receives an input pulse for each three injection pulses at its down-count terminal. During the down-count operation, the disabling pulse is shifted from terminal C3 toward C0 until AND gate 88 is disabled upon the appearance of the disabling on terminal C0.

It is to be noted that both up- and down-counting operations are interrupted as soon as the engine load enters the intermediate range between the lower and higher threshold levels so that the previous disablement mode is continued.

When engine RPM value is below the setting level, the pulse distribution control circuit 12 is disabled so that all of the cylinders are rendered active for full power delivery.

What is claimed is:

1. A multi-cylinder internal combustion engine having first and second cylinders, first and second electrically energizable fuel injectors respectively for said cylinders adapted when energized to discharge fuel thereinto, means for generating electrical pulses for energizing said fuel injectors, and air intake passage means including a throttle valve, comprising in combination:

first and second exhaust passage means respectively for said first and second cylinders;
exhaust gas recirculation passage means connected between said second exhaust passage means and said air intake passage means including a control valve responsive to vacuum depression upstream from said throttle valve;
means for sensing the magnitude of load exerted upon said engine; and
means for disabling said first fuel injector in response to the detected magnitude of engine load.

2. A multi-cylinder internal combustion engine as claimed in claim 1, further comprising first and second temperature sensors for generating first and second electrical signals respectively representative of the temperatures of said first and second cylinders, means for comparing said first electrical signal with said second electrical signal to generate an output when the difference between said signals indicates that the temperature of said second cylinder is much lower than the temperature of said first cylinder, and means for inhibiting said disabling means in response to the output of said comparing means.

3. A multi-cylinder internal combustion engine as claimed in claim 1, further comprising means for generating a timing signal at intervals and means for inhibiting said disabling means in response to said timing signal.

4. A multi-cylinder internal combustion engine as claimed in claim 1, further comprising means for sensing engine RPM, means for comparing the sensed engine RPM with a fixed reference and means for inhibiting said disabling means when said sensed engine RPM is below said fixed reference.

5. A multi-cylinder internal combustion engine as claimed in claim 1, wherein said disabling means comprises an up-down counter operable to count in a first direction when the magnitude of engine load is below a first threshold level and operable to count in a second direction when the magnitude of engine load is above a second threshold level high than said first threshold level, wherein the stored binary count of said up-down counter represents the number of disabled cylinders.

6. A multi-cylinder internal combustion engine as claimed in claim 5, wherein said disabling means further includes means for holding the stored binary count of said up-down counter when the detected magnitude of engine load is intermediate said first and second threshold levels, whereby the number of disabled cylinders is maintained at a value obtained prior to the detection of the intermediate value of said magnitude.

* * * * *